Nov. 21, 1950     R. G. LE TOURNEAU     2,531,061
TWO-SPEED POWER STEERING MECHANISM AND
SWITCH CONTROL MOUNTING THEREFOR
Filed Jan. 15, 1946
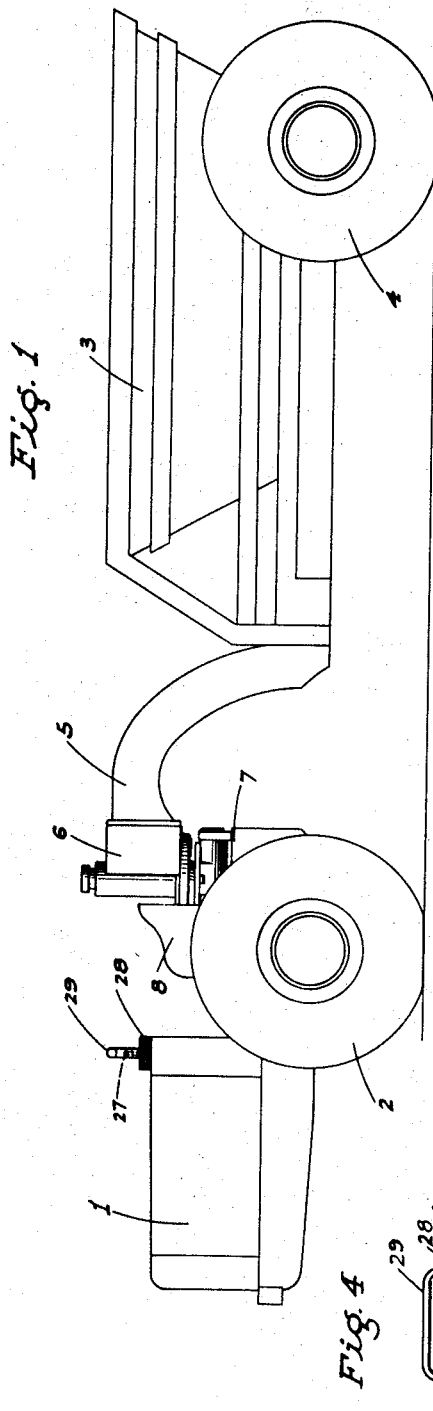
INVENTOR.
R. G. LeTourneau
BY
*[signature]*
ATTYS Patented Nov. 21, 1950

2,531,061

UNITED STATES PATENT OFFICE 2,531,061

TWO-SPEED POWER STEERING MECHANISM AND SWITCH CONTROL MOUNTING THEREFOR

Robert G. Le Tourneau, Peoria, Ill., assignor to R. G. Le Tourneau, Inc., Stockton, Calif., a corporation of California Application January 15, 1946, Serial No. 641,265

5 Claims. (Cl. 180—79.1)

This invention relates in general to a power steering mechanism for wheel tractors capable of traveling at substantial speeds. In particular the invention is directed to an improved steering mechanism of the type which is interposed or coupled in operative relation between a wheel tractor at the rear and the front end of a rigid forwardly projecting draft unit of a trailer. The present invention is especially useful in a tractor-trailer combination wherein the tractor is of two-wheel type, and the trailer is an earth carrying or working implement, or the like.

One object of the present invention is to provide a novel power steering mechanism for a tractor-trailer combination, as above, which mechanism is constructed so that a slower, or relatively faster, steering action may be obtained at the selection of the tractor operator. This is an advantageous feature for the reason that when the tractor is traveling at low speed a fast steering action may be accomplished in order to avoid time lost in maneuvering the implement, and yet at higher tractor speeds a relatively slow steering action is had in order to avoid steering to right or left, with resultant weaving of the tractor.

Another object of this invention is to provide a two-speed power steering mechanism, as in the preceding paragraph, which embodies a reversible two-speed electric motor operative to provide steering of the tractor at either high or low speed, selectively, there being a control circuit for said motor including a low-high speed switch assembly mounted on the tractor in a position accessible to, and for actuation, by the operator.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of a two-wheel tractor-trailer combination including a power steering mechanism embodying the present invention.

Figure 2 is a diagram, in simplified form, of a circuit which may be employed in connection with this invention.

Figure 3 is an elevation of one of the switch units, detached.

Fig. 4 is a fragmentary view of the operator's hand grip and adjacent switch control levers.

Referring now more particularly to the characters of reference on the drawings, the invention is here shown as embodied in a tractor-trailer combination which includes a two-wheel tractor 1 having a pair of transversely spaced drive wheels 2. The trailer as here shown for illustration as a dump wagon, is indicated at 3 and includes, at the rear, a pair of transversely spaced supporting wheels 4. A rigid draft neck 5 is fixed on the trailer 3 at the front and projects forwardly therefrom in the shape of a gooseneck; said draft neck 5 being fixed at its forward end in connection with a power steering mechanism 6 which is mounted on and upstands from the rear deck 7 of the tractor 1 to the rear of the operator's seat 8. The electric power steering mechanism 6 includes a reversible electric motor 9 operative to cause steering of the tractor 1 to right or left relative to the trailer 3. An elecric power steering mechanism of the general type employed is illustrated in U. S. Patent No. 2,400,868.

The reversible electric motor 9 includes a high-speed winding 10 and a low speed winding 11.

A heavy-duty generator 12 is mounted on the tractor in any convenient location, and is driven from the tractor engine (not shown).

A three-wire main energizing circuit 13 leads from the generator and branches into parallel, reversible energizing circuits 14 and 15. The branches 14 and 15 are connected to the high-speed and low speed windings 10 and 11, respectively, of the reversible electric motor 9.

Reversing relays 16 and 17 are interposed in the energizing circuits 14 and 15, respectively; said relays being operative to cause reversible operation of the motor 9 through the medium of the high-speed winding 10 or the low speed-winding 11, respectively. The reversing relays 16 and 17 include three-wire control circuits, indicated at 18 and 19, respectively.

The control circuits 18 and 19 include a common lead 20 which connects to one terminal of a battery 21, which battery is charged from the generator 12 through a conventional charging circuit (not shown).

Separate microswitches 22 are interposed in corresponding ones of the remaining two leads 23 of each of the control circuits 18 and 19. Each pair of microswitches, i. e. the pair corresponding to each control circuit, are mounted in facing relation on a U-shaped supporting bracket 24 and are actuated in the manner hereinafter described in detail.

On the side of the microswitches 22 opposite the reversing relays, the wires 23 are connected to a common lead 25 which extends to the terminal of battery 21 opposite the lead 26.

The microswitches 22 are normally open and the push buttons 26 thereof are disposed in adjacent but spaced relation, there being an upstanding lever 27 mounted on the bracket 24 for swinging movement, selectively, in the direction shown by the arrows in Fig. 3. It will be seen that when the lever 27 is thrown in one direction, one of the microswitchs will be closed, while movement of the lever in the opposite direction will close the other microswitch.

The two switch units are mounted on a switch box 28 on the tractor adjacent but ahead of the operator's seat 8, the two levers 27 projecting upwardly, for selectively, manual actuation, adjacent and within the confines of, a transverse, upstanding, arch type hand grip 29 for the operator.

With one hand on the grip 29 the fingers of such hand may be employed to manipulate the levers 27. The brackets 24 are mounted in the switch box 28 so that the levers 27 swing laterally of the tractor. As the switch levers 27 are disposed within the confines of the arch type hand grip 29 (i. e., in the same vertical transverse plane), and as said switch levers work laterally of the tractor, an important safety feature is provided. By reason of this arrangement the switch levers 27 cannot readily be actuated to cause accidental steering of the tractor should the operator's hand or other part of his body lunge forward into the switch assembly during operation of the tractor.

When the above described two-speed power mechanism is in use, it functions as follows:

If the tractor 1 is maneuvering at relatively slow speed the operator steers the tractor by manipulating, to the right or left, the lever 27 corresponding to the control circuit 18 and reversing relay 16 in the energizing circuit 14, which conects to the high-speed winding 10. This causes the electric motor to rotate in the selected direction at a relatively high speed, effecting quick turning of the tractor in a corresponding direction.

However, if the tractor 1 is traveling at relatively high speed, a slow speed steering action is necessary in order to prevent over-steering to right or left with resulting weaving of the tractor. To accomplish such low speed steering the operator manipulates the other lever 27 to right or left, causing corresponding operation of the motor 9 through the medium of the low speed winding 11, which winding is energized by the circuit 15, which is in turn controlled by the reversing relay 17 and the control circuit 19.

By reason of the two-speed power steering mechanism the operator, at his selection, can cause steering of the tractor to right or left, with the steering action slow or fast as travel speed of said tractor may require.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. Steering control mechanism for a vehicle combination which includes a tractor, a trailer, a power steering mechanism connecting the tractor and trailer, said steering mechanism being responsive to said control mechanism, an operator's seat on the tractor, and a hand grip on the tractor accessible from the operator's seat; the hand grip being of upstanding, transverse, arch type and said steering control mechanism including upstanding, finger movable elements mounted on the tractor adjacent and in a position relative to the hand grip so that said elements may be actuated by the fingers of an operator's hand grasping said grip and without releasing the latter.

2. A manually actuated switch assembly for a tractor operator controlled circuit of an electric power steering unit coupled between a tractor and trailer, and wherein the switch assembly is disposed on the tractor adjacent and in front of the operator's seat thereon; said switch assembly comprising an upstanding transverse hand grip fixed on the tractor, said hand grip being of arch type including a top bar, a switch support on the tractor between opposite ends of the hand grip and below said top bar, a plurality of switches mounted on the support, and each switch including an upstanding finger movable swing lever projecting upward from the support a distance to permit the engagement and actuation of said levers by the fingers of an operator's hand grasping said top bar of the grip and without releasing the latter.

3. A manually actuated switch assembly for a tractor operator controlled circuit of an electric power steering unit coupled between a tractor and trailer, and wherein the switch assembly is disposed on the tractor adjacent and in front of the operator's seat thereon; said switch assembly comprising an upstanding transverse hand grip fixed on the tractor, said hand grip being of arch type including a top bar, a switch support on the tractor between opposite ends of the hand grip and below said top bar, a plurality of switches mounted on the support, and each switch including an upstanding finger movable swing lever projecting upward from the support a distance to permit the engagement and actuation of said levers by the fingers of an operator's hand grasping said top bar of the grip and without releasing the latter; the upstanding swing levers of the switches being disposed within the confines of the hand grip to afford protection to said levers by said grip.

4. A switch assembly as in claim 3 in which said levers are mounted for swinging motion laterally of the tractor.

5. A manually actuated switch assembly for a tractor operator controlled circuit of an electric power steering unit coupled between a tractor and trailer, and wherein the switch assembly is disposed on the tractor adjacent and in front of the operator's seat thereon; said switch assembly comprising an upstanding transverse hand grip fixed on the tractor, said hand grip being of arch type including a top bar, a switch support on the tractor between opposite ends of the hand grip and below said top bar, a plurality of switches mounted on the support, and each switch including an upstanding finger movable swing lever projecting upward from the support a distance the engagement and actuation of said levers by the fingers of an operator's hand grasping said top bar of the grip and without releasing the latter; the electric power steering unit being two-speed with separate reversible circuits connected thereto, and there being one switch and lever corresponding to each circuit.

ROBERT G. LE TOURNEAU.

REFERENCES CITED

The following references are of record in the file of this patent:

UNITED STATES PATENTS

| Number | Name | Date |
|---|---|---|
| 653,169 | Coleman | July 3, 1900 |
| 774,018 | Wust-Kunz | Nov. 1, 1904 |
| 871,513 | Lohr | Nov. 19, 1907 |
| 914,919 | Coles | Mar. 2, 1909 |
| 987,441 | Dickinson | Mar. 21, 1911 |
| 1,210,762 | Church | Jan. 2, 1917 |
| 1,709,134 | Lewis | Apr. 16, 1929 |
| 2,224,411 | Smith | Dec. 10, 1940 |
| 2,232,165 | Cochran | Feb. 18, 1941 |
| 2,248,251 | Reeves | July 8, 1941 |
| 2,298,054 | Howell | Oct. 6, 1942 |
| 2,400,868 | Le Tourneau | May 28, 1946 |

FOREIGN PATENTS

| Number | Country | Date |
|---|---|---|
| 138,072 | Great Britain | May 6, 1920 |